United States Patent [19]

Schmitt

[11] 4,274,452

[45] Jun. 23, 1981

[54] DIAPHRAGM VALVES AND VALVE SYSTEMS

[75] Inventor: Friedrich W. Schmitt, Gau-Algesheim, Fed. Rep. of Germany

[73] Assignee: Robert J. Albert, Salem, N.H.

[21] Appl. No.: 972,904

[22] Filed: Dec. 26, 1978

Related U.S. Application Data

[63] Continuation-in-part of Ser. No. 923,062, Jul. 10, 1978, abandoned.

[30] Foreign Application Priority Data

May 19, 1978 [DE] Fed. Rep. of Germany ....... 2821801

[51] Int. Cl.³ .................. B65B 3/04; F16K 11/10; F16K 31/365
[52] U.S. Cl. .................... 141/1; 137/625.3; 141/285; 141/392; 251/61.1
[58] Field of Search ............... 137/625.3; 141/1, 115, 141/392, 285; 251/61.1

[56] References Cited

U.S. PATENT DOCUMENTS

| 3,792,720 | 2/1974 | Robbins | 251/61.1 X |
| 3,927,440 | 2/1976 | MacGregor | 251/61.1 |
| 4,027,622 | 7/1977 | Osheroff | 251/61.1 X |

*Primary Examiner*—Frederick R. Schmidt
*Attorney, Agent, or Firm*—Wolf, Greenfield & Sacks

[57] ABSTRACT

A diaphragm valve housing has a flexible diaphragm positioned to permit access of at least two of three channels passing within said valve housing to one side of said diaphragm, through channel ports, to allow fluid flow between the channels. A control vent opens to a second side of said diaphragm to allow a control fluid to press said diaphragm against a sealing surface to seal said channels from one another. The valve construction can be used in various combinations with other like valve constructions having more or fewer channels therein.

38 Claims, 5 Drawing Figures

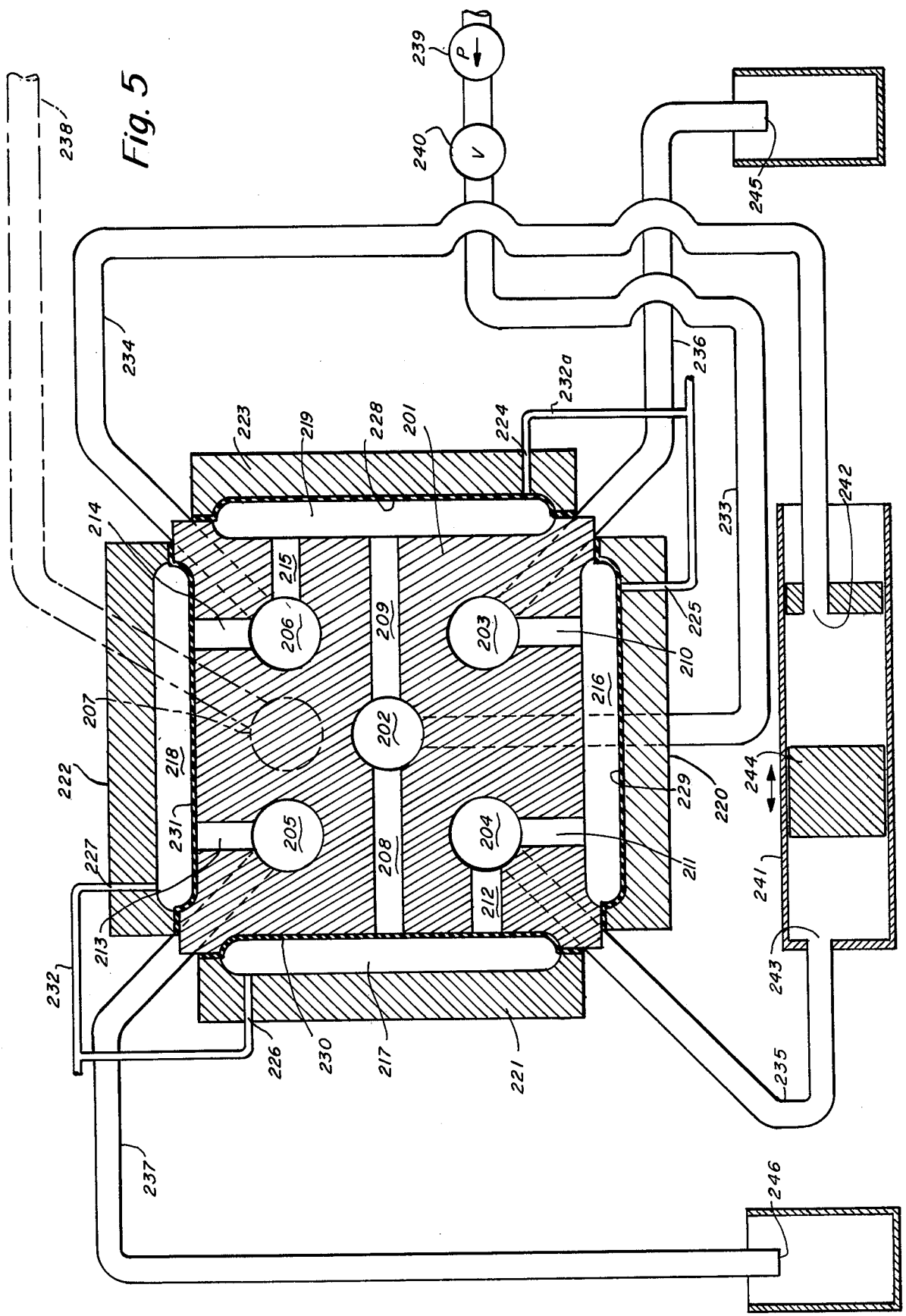

DIAPHRAGM VALVES AND VALVE SYSTEMS

RELATED APPLICATION

This application is a continuation-in-part of copending application Ser. No. 923,062 filed July 10, 1978, now abandoned.

BACKGROUND OF THE INVENTION

Diaphragm or membrane valves are known in the art. The flexible diaphragm is secured between two mating faces of the valve body, sometimes serving as a gasket or seal there between, and forms two discrete chambers by completely covering two more or less symmetrical shallow indentations fabricated in the joined faces. One of the chambers is connected by suitable ports or vents to a source of gas or liquid under pressure sufficient to force the diaphragm to stretch and flatten against the surface of the mating indentation that comprises the second chamber. This second chamber is ported to the exterior of the valve body by an inlet and outlet channel through which the product liquid or gas flows through respective piping or tubing connected to the valve body. Product fluid flows freely through the valve chamber until pressure is applied in the control chamber to cause the diaphragm to press against the inlet-outlet ports and stop the flow.

Mechanical valves of prior art may have more than two ports and the flow of fluid between the plurality of channels is controlled and directed by movable plugs or plates having apertures therethrough that align with selected channels when suitably positioned. Such valves are subject to the usual problems of mechanical valves, e.g. wear on moving parts, packing leaks, inaccurate positioning in open and close position, corrosion and the like.

Two-channel diaphragm valves, as above described, are often combined in groupings or arrays to obtain a variety of liquid flow patterns in blending, metering, filling and other operations. While such groupings are useful and necessary, they are usually complex, hence difficult to assemble, connect and control because of the number of valves required. Even when many valves are contained in a single housing, as taught by J. G. Smith et al, USP Pat. No. 3,176,714, the device is difficult to manufacture and to maintain in service, as can be envisaged by the task of repairing a single failed membrane in the system.

Dosing cylinders with double acting pistons are known in the art, in which product fluid under pressure is admitted to one end of the cylinder in which the piston is mounted. This forces the piston to the other end of the cylinder, displacing product fluid therefrom via an exit port. Each time the cycle is reversed, an accurately metered amount of fluid is expelled from alternate sides of the piston. Such a system requires a minimum of four valves for operation, and corresponding pressure controls if said valves are of the diaphragm type.

Means for axially adjusting the position of one end wall of the cylinder of such devices, whereby to change the cylinder volume, and thus the metered amount of fluid, are also known in the art.

SUMMARY OF THE INVENTION

It is an object of this invention to provide a simple, easily constructed diaphragm valve having within the valve housing at least three channels for conveying product fluid and in which the actuation of a flexible diaphragm permits flow between at least two of the channels.

Another object of this invention is to provide a valve in accordance with the preceding object which is of modular construction so as to permit joining two or more such valves at their mating faces in a simple clamping manner to form channels within the assembly without piping connections.

A further object is to provide a sanitary valve having no wearing mechanical parts, packing glands or the like, the fluid flow therein being controlled by a flexible membrane, or diaphragm, which can be caused to cover and seal a plurality of port holes connecting a chamber on the other side of the diaphragm to at least two of the channels in the valve body.

Still another object is to provide a diaphragm valve of modular construction which can be compactly assembled with a plurality of like valves by simple clamping or bolting means and without piping connections into groupings or arrays in which a variety of flow patterns can be provided by the operation of the diaphragm controlling flow between channels.

Another object is to provide an apparatus for dosing and metering fluids using a valve grouping, in accordance with the preceding objects, to control fluid flow through a dosing cylinder device.

Still another object of this invention is to provide a single valve housing wherein a plurality of diaphragms can be individually actuated so as to control fluid flow between a plurality of channels in the valve housing in programmed patterns as from one or more feed channels within the housing.

It is a still further object of this invention to provide an improved and simplified method of controlling fluid flow by the use of a flexible membrane carried in a valve body to permit flow between any or all of three discrete channels having ports on one side of said membrane.

According to the invention, a valve comprises a housing with the housing having three discrete channel means for carrying fluids passing within said housing. A flexible valve actuator preferably in the form of a diaphragm or membrane lies on one side of the channel means and defines with the housing a first valve chamber on one side of said actuator. Port means permit access of at least two of said channel means to the first valve chamber. The housing further defines a second valve chamber lying on a second side of the actuator. A control hole means or vent hole permits fluid pressure control of the actuator to establish a first position of the actuator blocking access by the port means and a second position of the actuator where the first valve chamber is interconnected with the at least two channel means to permit flow of fluids therebetween.

Compensation for product viscosity may be made by selection of the size and frequency of the ports between the channels and the first valve chamber.

Preferably the valve is used in combination with other substantially similar valves in modular arrangements.

In a preferred embodiment, a plurality of valves as above described are grouped to provide for accurate metering in a dosing or metering apparatus.

A valve construction may be three-dimensional, with the housing having one feed channel, or more than one for a fluid to be controlled. The housing carries a plurality of at least two diaphragm valve constructions on outer surfaces thereof with each diaphragm valve construction having a first valve chamber formed by a portion of the housing, a second valve chamber formed by a portion of the housing, corresponding second valve chambers formed by caps with a diaphragm sealed between each cap and the surface of the housing. The feed channel is interconnected with each of at least one diaphragm valve construction at the first valve chamber, with control means provided for permitting flow from the feed channel and between two valves. Such a construction, having four membrane valves, could control a double acting piston dosing apparatus with one product discharge line or two product discharge lines, as will be described.

It is a feature of this invention that no mechanically actuated parts are necessary to fully control various apparatus such as the dosing machine of the preferred embodiment of this invention. Only the diaphragm or membrane wears in the valve structures of the present invention, as no other moving parts are required. The valve housings are preferably in modular form to allow a plurality of valve housing to be clamped together by simple means. Piping and packing leaks of conventional valves are eliminated. The valves completely enclose the liquid being controlled so as to maintain sterile conditions throughout the assembly or apparatus. Any desired flow pattern can be obtained by preselecting the number and arrangement of valve modules without the use of pipes for interconnection.

BRIEF DESCRIPTION OF THE DRAWINGS

The above and other features, objects and advantages of the present invention will be better understood from the following description of the specification when read in connection with the accompanying drawings in which:

FIG. 5 is a semidiagrammatic drawings showing a cross sectional view through a single valve housing carrying four diaphragm chambers in a system for metering fluids.

DESCRIPTION OF PREFERRED EMBODIMENTS

Figure 1:
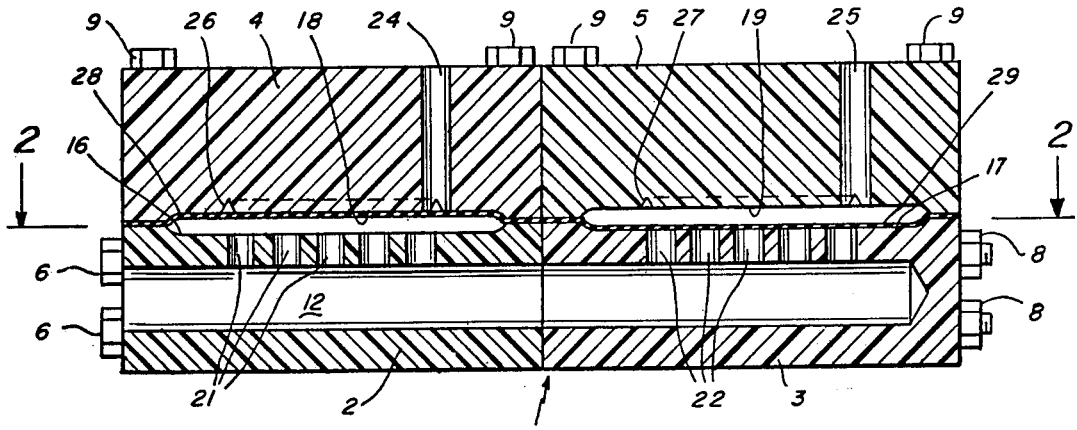
FIG. 1 is a cross sectional view through the center line of a two-valve housing grouping showing preferred embodiments of the valve of this invention.
Figure 2:
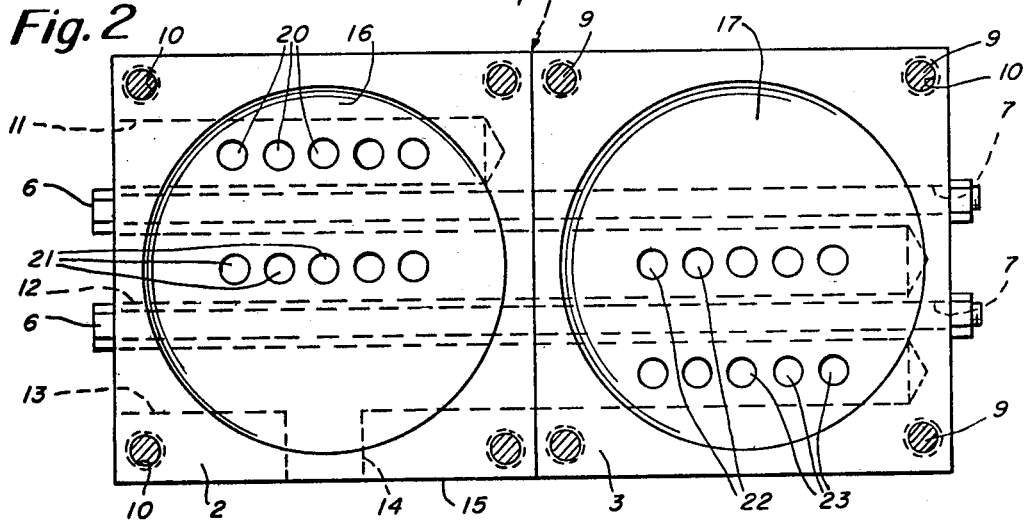
FIG. 2 is a top plan view through line 2—2 thereof.

With reference now to the embodiments shown in FIGS. 1 and 2, a valve grouping is shown of two membrane or diaphragm valves. A grouping 1 has two valve housings formed of two blocks 2 and 3 covered by mating caps 4 and 5 respectively. The blocks 2 and 3 are held together by threaded bolts 6, which pass through drill holes and have locking nuts 8 clamping the adjacent valve housings together. The caps 4 and 5 are connected to the blocks 2 and 3, respectively, by clamping screws 9 which pass through the caps and are threaded into and grip threaded holes 10. There are three channel means extending parallel to each other in the valve housing shown on the right-hand side of the grouping 1. These channels are in the form or discrete elongated bores, or channels 11, 12 and 13 parallel to one another. Channel 11 penetrates left block 2 only, and terminates at one end thereof. Channels 12 and 13 continue through block 2 and into block 3. The channels are preferably discrete, parallel bores. The ends of the bores can be closed by bungs, end caps or the like, or can be terminated within the valve housing, as shown. Inside block 2, a branch channel 14 passes from channel 13 to a free exterior surface 15 of block 2. This branch channel 14 is shown for illustrative purposes only. Branch channels can be interconnected with any of the three parallel channels depending upon the purpose of use of the valve. In some cases, no branch channels are used.

The housing blocks 2 and 3 have basin-shaped indents 16, 17 on their upper faces. Mating basin-shaped indents 18 and 19 are formed in the caps 4 and 5 respectively as shown in FIG. 1. This defines a first chamber as shown in FIG. 1 left-hand housing, on one side a diaphragm 28, which first valve chamber allows access of channels 11 and 12 to each other via two series of holes, or ports, 20 and 21 originating in channels 11 and 12 respectively and terminating in the chamber formed by the diaphragm and the indent 16. The diaphragms 28 and 29, with indents 18 and 19, form second chambers to which pass control holes or ports 24 and 25. Two series of holes 22 and 23 in the right-hand valve of FIG. 2 originate from channels 12 and 13 respectively and open into the indent 17. Control holes or vents 24 and 25, through which switch control pressure can be introduced, open into the indents 18 and 19 respectively. A continuous circular ring groove as shown at 26 and 27 serves to distribute control air or liquid and is located at the bottom of the indents as shown in the drawings.

The membranes 28 and 29 serve as valve actuators and are preferably each generally square and of approximately the same outline, i.e., length and width, as the mating surfaces of each cap and block pair, 2–4 and 3–5, so as to be secured therebetween and held firmly in place by the clamping action of the screws 9. This also seals the mating faces of blocks and caps. The membrane 29 is shown subjected to control pressure in FIG. 1 and therefore lies at the bottom of the indent 17 closing ports 22. A corresponding control pressure is not exerted on the membrane 28 and this membrane is therefore pressed against the surface of the indent 18 by the pressure of product flowing in the valve through channels 11 or 12 and ports 20 or 21.

In the grouping shown in FIGS. 1 and 2, a fluid transmitted via channel 12 can be taken off or delivered as desired through channel 11 or channel 13 by proper control of the valve diaphragms. Alternately, a product transmitted through channel 11 can be taken off through channels 12 and 13, etc.

In all cases, the valve housing of the invention has at least three channel means preferably parallel and adjacent to one another. Preferably the channels are arranged so as to pass adjacent to the indents 16 and 17 to which they are connected by ports 20, 21, 22, 23, whereby flow between channels is controlled by diaphragms 28 and 29. A single three-channel valve can be used in combination with other three-channel valves or two-channel valves. Obviously more than three channels can be formed in each valve. Preferably the membrane or diaphragm extends over the channels themselves. However, the diaphragm need cover only the ports of the channels to be controlled. In some cases, four, five or more channels can be formed in each valve.

In the construction of FIGS. 1 and 2, three channels are used in one valve of the grouping. This makes possible three different pairings by means of actuating two membranes. Hence, very compact valve arrays can provide numerous possible pairings.

It is desirable that the membranes of the modular valves be of the same size to simplify manufacture and maintenance. The valve housings are of simple design and can be easily molded or machined of plastic or any suitable material. Preferably the joining external faces of the valves are constructed so that they will mate accurately and seal with other like valves in plural arrangement whereby their channels are continuous and coaxial as shown in FIGS. 1, 2 and 4. This eliminates the need for piping. Clamp means such as bolts 6 and nuts 8 secure the valves in tight abutment with or without gaskets. In some arrangements, channels in valves can be plugged by bungs, plugs or cap screws as in FIGS. 3 and 4, or the channels may be permanently closed on one end by terminating them within the valve block as shown in FIG. 2. Branch channels from the main channels, such as 14 from 13, FIG. 2 can be easily fabricated in the modular valves.

Preferably, the channels are ported to the valve chamber by a series of apertures, or ports as shown at 20 and 21. Preferably the total cross sectional area of the apertures is at least equal to the cross sectional area of the channel they serve, in order that product may pass unrestricted therethrough from the channel to the first valve chamber. However, the hole size can be also be varied to accommodate products of varying viscosity. The preferred plurality of port holes to each channel serve also to minimize deformation and attrition on the flexible diaphragm membrane when it is in contact with the ports and under control pressure.

In the preferred design form, the ports, 20, 21, 22, 23 of the channels open on the flat bottom of the basin-shaped indent in the block surface facing the diaphragm and the diaphragm or membrane is positioned between the mating faces of the housing cap and block, both of which posses opposing substantially identical basin-shaped indents. Thus the membrane in operation has two defined end or stopping positions in each of which, despite its large surface, it is securely supported. Both end positions are preferably symmetrical with one another, so that overstressing of the membrane in one or the other position is avoided.

Particular advantages can be obtained when using the membrane valve as a relief or pilot valve. In this case a group of valves has an additional membrane valve, the membrane of which is constantly subject to a control pressure lower than the control switch pressure. This pilot valve is positioned between the channel section subjected to the entry pressure and the exit channel section. Thus any pressure surge arising from sudden or inadvertent operation of the valve group or the product pump is relieved by the pilot valve opening to bypass the fluid to a return container, preventing damaging stress on the valve membranes.

Preferably the flexible diaphragm or membrane is made of polytetrafluoroethylene. This material has the required elasticity and firmness and is inert to most chemical products for which the valves are used. However, other flexible materials can also be used to make the membranes.

In one form of the valve, a single housing carries a second diaphragm on the opposite side of channel means, thereby utilizing plural channel means with two diaphragms. Also more than two valves can be formed on a single elongated housing along a plurality of channels. A single housing block can carry on its surfaces a plurality of diaphragm valve constructions oriented in two or more dimensions, providing a very compact array, capable, for example, of controlling a dosing cylinder and distributing fluid therefrom to a plurality of external points as desired.

Figure 3:
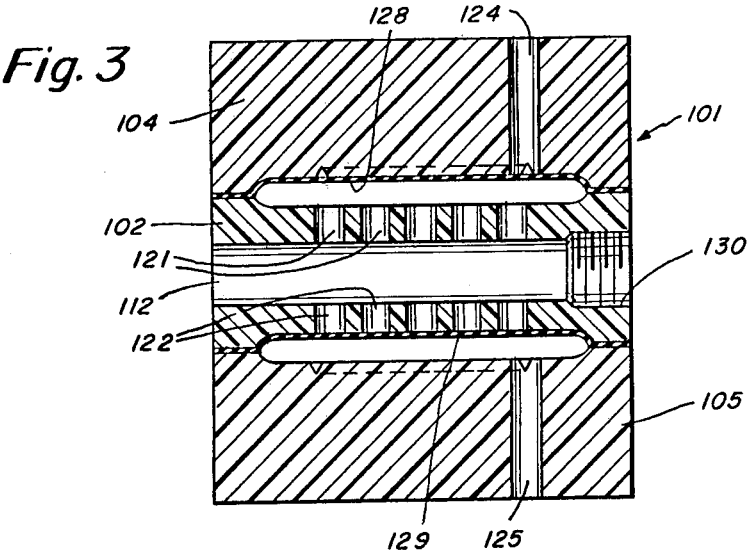
FIG. 3 is a cross sectional view through an alternate embodiment thereof.
Figure 4:
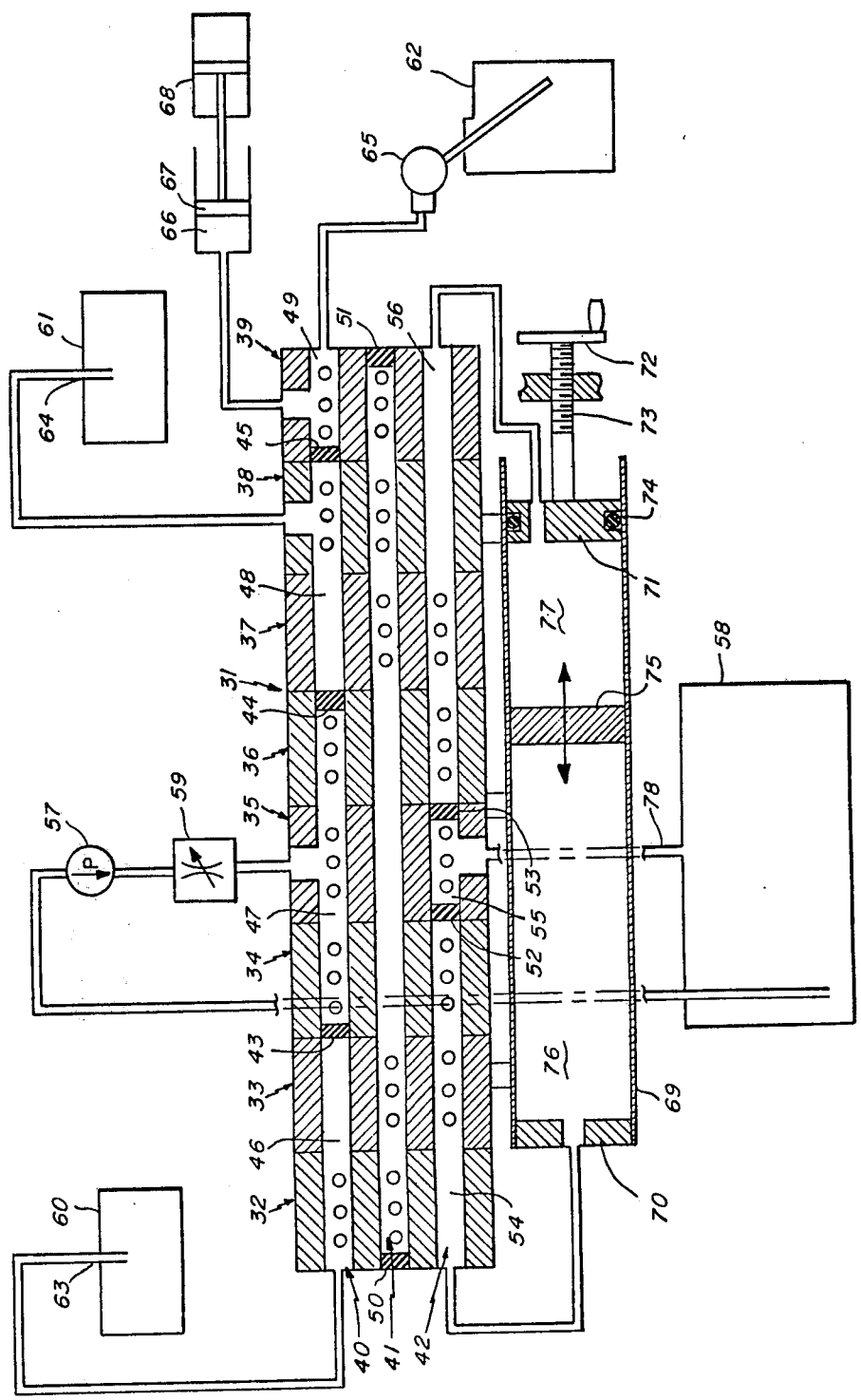
FIG. 4 is a semidiagrammatic view of a grouping of valves in accordance with the present invention in a metering apparatus.

FIG. 3 shows an alternate design where a single block forms a housing having two caps with the parts corresponding to those in FIG. 1 being referred to by reference numbers increased by one hundred. In this case, the housing 101 has a block 102 which has a cap 104 and a second cap 105 on both sides of the block. A series of holes 121 and 122 are situated on opposite sides of the channel 112. Membranes 128 and 129 are operated via the control drill holes 124 and 125 by a control pressure. The channel 112 is provided with a thread 130 at one end into which a closing cap or bung can be screwed. In this embodiment, product flow in channel 112 can be directed to other channels through the use of either the chamber overlying the channels or the chamber underlying the channels.

A particularly advantageous application of the valve of this invention is as a grouping for controlling a dosing, or metering, filling device. A first channel of a valve grouping is connected with the metering device, a second channel to a product conveyor pump and a third channel to a filling point. The distribution valve grouping can be very compactly designed. It is highly advantageous that in the valve grouping no moving parts have to be sealed or conduited to the exterior and that no impurities can infiltrate the product from the exterior.

In the preferred form a valve grouping is used with a dosing or metering cylinder divided into compartments by a piston which can be driven from either side by means of product pressure. Each compartment in the cylinder is ported. Two separate sections of a first channel of a valve grouping are connected each to opposite sides of the cylinder. A section of a second channel connects both of these first sections to a product conveyor pump and the third channel distributes the metered product to at least one filling point or product outlet. Such a dosing or metering filling system permits the absolutely sterile dosing or metering of a liquid or fluid product. No seals for moving parts or other joints to the outside of the valves or the dosing cylinder are required. At least four membrane valves for the valve grouping can be put together compactly without the use of pipes, although pipes can be used if desired.

The third channel can be conected directly to a single filling point or to several simultaneously operating filling points provided that in the latter case the flow resistances in the individual outlet pipes are rendered compatible to one another. One can also operate different filling points as desired, for example, when the channel sections of the third channel connect to at least two filling points. In order to make the device more compact, channel sections connected to the filling points may lie in the extension of the first or second channels.

An adjustable throttle can be inserted as a regulator in the dosing embodiment of this invention. By regulating the rate at which product enters the apparatus, one controls the velocity of the piston within the cylinder, thereby controlling stroke frequency.

In FIG. 4, a preferred embodiment of a dosing or filling and metering device is shown in which a valve grouping has a combined housing 31 with eight membrane valves 32-39.

Three channels, 40, 41 and 42 are, as the drawing shows, paired via ports or holes in three different combinations by the membrane valves. Channel 40 is divided into four separate channel sections 46, 47, 48 and 49 by three stops 43, 44 and 45. Channel 41 is closed at both ends by stops 50 and 51.

Channel 42 is divided into three separate channel sections 54, 55 and 56 by stops 52 and 53.

A product conveyor pump 57 sucks the product to be metered and dosed out of a storage container 58 and conveys it with a pressure of 0.5 to 2 bars via an adjustable throttle 59, serving as a filling time regulator, into the channel section 47 of channel 40. Filling points 60, 61 and 62 are each connected to the remaining channel sections 46, 48 and 49. The points 60 and 61 have fixed position filling jets 63 and 64, the point 62 has a mobile filling pistol 65. Apart from this, a back sucking device 66 is connected to the channel section 49, the pistons 67 of which can be operated by means of a pneumatic servomotor 68. This device prevents drippage from the filling pistol between doses. The valve grouping is mounted on a dosing cyliner 69, one wall 70 of which is fixed and the other wall 71 of which can be moved axially by a screw spindle, adjustable with a hand wheel 72. Seal 74 seals the interior of the cylinder 69. In this cylinder, a piston 75 can slide freely, responding to the pressure in the two cylinder compartments on either side of it. The cylinder compartment 76 is connected to a channel section 54 and the cylinder compartment 77 to the channel section 56. Channel section 55 is connected via a return pipe 78 to the storage container 58, so that membrane valve 35 also acts as a safety or pilot valve and is subject to constant control pressure, which is preferably only slightly higher than the pressure with which the product is introduced from the pump 57. Should a pressure surge occur, the membrane valve 35 opens and reduces the pressure via the return channel 78. The remaining membrane valves 32 to 34 and 36 to 39 are operated, at each desired time, by a switch control pressure, which only needs to be slightly higher than the control pressure of the membrane valve 35.

In operation, the following sequence results: by opening the membrane valve 34 and closing valve 36 the product transmitted by the pump 57 flows from channel section 47 to 54. Valve 33 is also closed, so the product flows into the cylinder compartment 76, causing the piston 75 to be driven to the right. Membrane valve 48 is open, and the metered product thus expelled enters the middle distribution channel 41. By opening one of the membrane valves 32, 38 or 39 this liquid can flow on to one of the filling points 60, 61 or 62. When the piston 75 has reached its final right side position, the membrane valves 34 and 37 are closed and the membrane valves 33 and 36 are opened. The piston 75 is then driven to the left under the influence of the pumped product pressure and thereby expels another metered quantity of the product again into the distribution channel 41, from where one of the points 60, 61 or 62 can be served. This sequence is constantly repeated. The quantity transmitted to each filling point is clearly and accurately determinable by the number of piston strokes and the position of the adjustable wall 71.

When filling with the pistol 65 and the hand-operated valve in the pistol 65 is closed, the piston 75 can slide no further and the pressure in the prior channel system increases. Thereupon, the membrane valve 35 opens so that no damage can occur. At the end of the filling procedure with the pistol, the piston 67 of the back sucking device is pulled back so that subsequent dripping from the pistol mouth is avoided by the resulting absence of pressure.

In the simplest case four membrane valves are adequate for such a dosing filling device, whereby naturally only one or two filling points can be connected. In such an array one valve must have three channels in accordance with this invention and one or more of the remaining valves may have two channels.

In the embodiment of FIG. 5, cubical block 201 forms a housing in which there are channels in the form of bores. Four opposed surfaces of the block have valve constructions formed therein in accordance with this invention. The channels within the block are ported to one or more of the valves mounted on the exterior surfaces of the block as will be disclosed. One channel within the block, designated as 202, is a feed channel from which fluid may be directed to selected other channels by the valves on the exterior of the block or housing 201. In the case of a simple module, all channels penetrate the block from one of the sides perpendicular to the sides carrying the valves but terminate before reaching the side opposite. The channel which acts as a feed channel may extend completely through the block, or may be closed at one end when a single housing is used. However, since it can be extended through the block, two or more blocks with plural valves may be connected in a modular array as previously described.

In FIG. 5, the block 201 has channels 202 203, 204, 205 and 206. If no pilot valve of the type shown with respect to FIG. 4 is used, all of the channels can terminate within the block. If a pilot valve (not shown) is required, channel 202 penetrates through the block as does a supplementary channel 207, which is connected to a product return line 238. Channels 202 and 207 then are connected through the pilot valve. In the embodiment of FIG. 5, no pilot valve is used and the lines 207 and 238 are shown in dotted outline. In the illustration of FIG. 5, the channel 202 is the feed channel. It communicates via ports 208 and 209 with basin-shaped indents 217 and 219 located on opposite sides of the block. Channel 205 communicates with indent 218 via port 213. Channel 206 communicates with indent 218 via port 214 and with indent 219 via port 215. The basin-shaped indents in the block are each spanned by a diaphragm as previously described. Indent 216 is spanned by diaphragm 229, indent 217 by diaphragm 230, indent 218 by diaphragm 231, an indent 219 by diaphragm 228. Each of the diaphragms is covered by a cap 220, 221, 222, and 223, with each cap having a basin-shaped indent complementary to the corresponding basin-shaped indent in block 201 thus forming first and second valve chambers for each of the diaphragm valve portions of the valve construction. Each cap serves to hold the diaphragm in place and as the fluid control side of each of the respective diaphragm valves. Fluid control enters the control side of the diaphragm via ports 224, 225, 226 and 227. In FIG. 5, a first position of the valve constructions is shown where the housing acts as a manifold and valve assembly operating with a dosing cylinder of the type previously disclosed. In the drawing, fluid under pressure is delivered by a product pump 239, via a regulating valve 240 to regulate pressure, to product line 233, and then to feed channel 202. Control pressure is applied to diaphragms 230 and 231 via control fluid line 232. These valves are in a closed position as shown in FIG. 5 with ports 208, 212, 213 and 214 closed. No control pressure is delivered to line 232a and therefore diaphragms 228 and 229 are opened by product pressure delivered through ports 209 to chamber 219. The product traverses chamber 219 to port 215, thence via channel 206 to product line 234, which conducts the product to port 242 on the right side of the dosing cylinder. Product pressure exerted on the right side of piston 244 displaces the piston to the left. This drives the contents of the left chamber of the cylinder through ports 243 and into line 235 whence it is forced into channel 204, and into chamber 216 via port 211. As chamber 216 is opened, the fluid under pressure passes through port 210 to channel 203, thence to channel 236 and to port 245 at the right filling station.

In the next half of the cycle, a switch has caused control fluid pressure in line 232 to be relieved, and causes control pressure to be applied through line 232a reversing the diaphragms from the position shown in FIG. 5. Therefore, chambers 217 and 218 are opened, chambers 216 and 219 are closed. In this mode, product under pressure enters chamber 217 via port 208 and exits chamber 217 via port 212 to channel 204. From channel 204, the product is carried by product line 235 through port 243 to the left chamber of cylinder 241. This displaces piston 244 to the right, forcing the contents of the right chamber of the cylinder through port 242 into line 234 from which it enters channel 206. The fluid then passes through port 214, traverses chamber 218, passes through port 213 to channel 205, thence to product line 237 and passes through port 246 into the left filling station. When the piston 244 reaches the end of its stroke, the valves are reversed to the mode as illustrated in FIG. 5.

If an integral relief valve is used in the embodiment of FIG. 5, channel 202 is bored through the housing block as is an auxiliary channel 207. The two are then bridged with a relief valve and pressure surges are relieved through return line 238.

The valve construction of FIG. 5 is the functional equivalent of a linear array of four membrane valves of the types shown in FIGS. 1, 2, and 4, or of an array of four individual fluid ducts, each interconnected with two or more of the necessary four individual valves. The valve construction of FIG. 5, exclusive of channel 202 can readily be modified to deliver a dose of product to a single product discharge line with each stroke of the piston.

When more than two of the embodiments of FIG. 5 are stacked as by having the feed channel 202 pass from end to end of each housing and interconnect with each other, a common feed channel can serve two metering cylinders. The modules can operate in parallel as well as in series and numerous modules can be so linked.

While FIG. 5 illustrates a cubical module, other polyhedral forms are also suitable. For example, an octagonal module, with the product feed appropriately connected with valves on the exterior faces of the housing, will perform the same functions as two cubical modules. Such an octagonal module can also accommodate a pilot valve and can be interconnected in series or in parallel with like modules or modules of other configurations. Valve constructions according to this invention, may be used in closed as well as open systems.

The blocks and caps of the membrane valve housings can be constructed of various materials, which will depend in part on the application purpose. For dosing, filling or metering devices, plastics such as nylon polyamides are preferred. These materials can readily be molded or machined, with individual channels within each housing module stopped by suitable bungs or terminated as desired. Channels within any module of an array may be interconnected with coaxial channels in adjacent modules and the modules may be held in place by suitable clamping means. Interconnecting pipes can be eliminated, making modular arrangements compact, simple to assemble and positive of operation. While polytetrafluoroethylene has been described as a preferred material, as for example in thickness of 0.5 mm, other materials can be used for the diaphragms (or other actuators used). The membranes or diaphragms are sealed by the clamping action of the two-part housings. In some cases, ring seals can be used on either side of the diaphragm as of elastic rubber material i.e. perbunan reinforced with fabric at a thickness of 4 millimeters. Systems of the type shown in FIG. 4 are capable of filling liquid products in an absolutely sterile manner so that the equipment can be used for filling, metering, blending and mixing of medicines, drinks, food products and the like. Among other applications of the valve system is control of fluids for heating.

What is claimed is:

1. A valve comprising a housing,
    said housing defining three discrete channel means for carrying fluids,
    a flexible valve actuator lying on one side of said channel means and defining with said housing a first valve chamber on one side of said actuator,
    port means for permitting access of two of said channel means to said first valve chamber with one channel means having no connection with said first valve chamber,
    said housing further defining with said valve actuator a second valve chamber lying on a second side of said actuator,
    control hole means for permitting fluid pressure control of said actuator to establish a first position of said actuator blocking said access by said port means and a second position of said actuator whereby said first valve chamber is interconnected with said at least two channel means.

2. A valve in accordance with claim 1 wherein said flexible valve actuator is a thin wall membrane disposed between said first and second chambers in sealing engagement and at least one of said channel means having no connection with said first valve chamber.

3. A valve in accordance with claim 2 wherein more than three channel means are provided.

4. A valve in accordance with claim 2 wherein said channel means are positioned so as to be mated with channels of substantially identical valves in a modular system.

5. A valve in accordance with claim 2 wherein said first and second chambers are formed in part by two mating parts of said housing having said membrane clamped therebetween.

6. A valve in accordance with claim 2 wherein said housing comprises a housing cap and a housing block,
    said housing cap defining a vent therethrough leading to said second valve chamber, and said cap being adapted to clamp proximate to its edges the said membrane and the said block when said housing is assembled.

7. A valve in accordance with claim 6 wherein said cap and said block are engaged to hold said membrane in sealing engagement between said first and second valve chambers.

8. A valve in accordance with claim 7 wherein said membrane is formed of polytetrafluoroethylene.

9. A valve in accordance with claim 8 wherein said housing, body and cap are formed of a polyamide.

10. A valve in accordance with claim 1 wherein said channel means comprise three parallel channels and said port means comprise a plurality of holes leading to said first chamber of said channels, which port means comprises a cross-sectional area at least as great as the cross-sectional area of the channel ported thereby.

11. A valve in accordance with claim 1 and further comprising at least two of said channel means being interconnected with a third valve chamber by second port means,
- a second flexible valve actuator lying on a second side of said channel means and defining in part a third valve chamber on one side of said second actuator,
- said housing further defining with said second valve actuator a fourth valve chamber lying on a second side of said second valve actuator,
- and second control hole means for permitting fluid pressure control of said second valve actuator to a first preselected position blocking access to said third valve chamber by said second port means and another preselected position where said third valve chamber is interconnected with said at least two channels.

12. A valve in accordance with claim 11 wherein said first and second valve actuators are located in substantial axial alignment.

13. A valve in accordance with claim 11 and further comprising said valve actuators each comprising a flexible diaphragm,
- said valve housing comprising a valve block carrying said channel means and a first and second valve cap,
- said first diaphragm being clamped between said first valve cap and said block and said second mentioned flexible diaphragm being clamped between said second valve cap and said valve block.

14. A valve in accordance with claim 1 and further comprising a second valve locked thereto in a modular array with at least two of the channels of each of said valves positioned so as to interconnect to form continuous channels.

15. A valve grouping in accordance with claim 14 wherein said interconnecting channels are stopped at least at one point, thereby blocking at least one channel of one valve from interconnecting with the corresponding channel of the adjacent valve.

16. A valve grouping in accordance with claim 15 wherein said valves are locked to each other by elongated bolt means.

17. A valve in accordance with claim 1 and further comprising a second cap means positioned on a second side of said block means,
- basin-shaped indents formed in the mating faces of said second cap means and said second side of said block means,
- a second flexible diaphragm means secured between said second cap means and said second side of block means whereby to define a third and fourth chamber on the second side of said channel means,
- port means connecting said third chamber with said channel means,
- a second access means to said fourth chamber for permitting fluid pressure to establish a first position of said diaphragm that closes said port means and a second position in which said third valve chamber is freely interconnected with said channel means.

18. A valve grouping comprising two membrane valves in accordance with claim 1 joined matingly in clamping arrangement whereby at least three channels of each valve are coaxially aligned and at least two channels of each valve are continous with mating channels of the other.

19. A valve grouping comprising first and second membrane valve, each membrane valve carrying a flexible membrane overlying inlet and outlet openings in a valve housing,
- said membrane of each valve being mounted to be pressed against a sealing surface located between said inlet and outlet by means of a control pressure applicable on one side of said membrane,
- said housing of one of said valves carrying at least three channels under its flexible membrane with at least two of said channels being interconnected with two corresponding channels in a second valve of said valve grouping, and at least two of said channels of each valve interconnected with said inlet and outlet of that valve and with a channel of said one valve having no connection with said one side of its membrane but defining a flow path for interconnection with a flow path defined by one of the two other channels in said last-mentioned valve, at some point spaced from said valve.

20. In a membrane valve defining a valve housing,
- a flexible membrane overlying three parallel channels two of which are ported to one side of said membrane and the third of which is not so ported but defines a flow path for interconnection with at least one of said two channels at a point spaced from said valve housing,
- and control hole means accessible to a second side of said membrane,
- a sealing surface on said one side of said membrane to permit control pressure to seal said ported channels from each other by application of said control pressure.

21. A valve comprising a housing
- said housing comprising a block section and a cap section each having one face that matches and mates with one face of the other,
- substantially identical basin-shaped indents in said mating faces of said block and cap,
- said block section further defining at least three discrete channel means therein for carrying fluids,
- a flexible diaphragm securely positioned between said mating cap and block faces, defining a first chamber with the indent of said block face and second chamber with the indent of said cap face with said first chamber overlying said channel means,
- port means for permitting fluid access of at least two of said channel means to said first valve chamber and one of said channel means having no connection with said first valve chamber but providing a fluid flow path for interconnection with a corresponding path in an adjacent device,
- access means for fluid control pressure to said second chamber to establish a first position of said diaphragm that closes said port means and a second position in which said first valve chamber is freely interconnected with said channel means.

22. A filling apparatus comprising a plurality of membrane valves and a dosing cylinder, said cylinder being divided by a double acting piston into first and second compartments having first and second ports respectively,
    a first and second of said plurality of valves having at least two discrete channels for carrying product fluid,
    said first and second valves each having a first valve chamber covered by a fluid pressure controlled valve membrane,
    said second valve having three discrete channels one of which is connected with the first port of said cylinder,
    said first valve having one channel connected with the second port of said cylinder,
    whereby the said one channel of each of the said first and second valves transmits product fluid to and from the said first and second compartments of the said cylinder, respectively,
    said valves providing a discrete channel for receiving a supply of product fluid and a discrete channel for dispensing a predetermined dose of product fluid.

23. A filling apparatus in accordance with claim 22 wherein said first and second valves each comprise a housing having,
    a flexible valve membrane positioned on one side of said channels of each valve and defining with said housing of each valve a first valve chamber on one side of said membrane,
    port means for permitting access of at least two of said channels to said first valve chamber,
    said housing of each valve further defining with said valve membrane, a second valve chamber lying on a second side of said membrane,
    vent hole means for permitting fluid pressure control of said membrane to establish a first position of said membrane closing said access by said port means and a second position of said membrane where said first valve chamber is interconnected with said at least two channels.

24. A filling apparatus in accordance with claim 23 wherein a third valve constructed in accordance with said first valve, acts as a pilot valve to relieve pressure surges within said filling apparatus.

25. A filling apparatus in accordance with claim 24 and further comprising said pilot valve connected to a product reservoir via a product return line.

26. A filling apparatus in accordance with claim 22 and further comprising,
    third and fourth membrane valves constructed in accordance with said first valve,
    with said first, second, third and fourth valves linked together and a channel of each of three of said valves interconnected.

27. A filling apparatus in accordance with claim 26 wherein said one channel interconnecting said three valves is further interconnected with a product feed line.

28. A filling apparatus in accordance with claim 26 wherein said valves are in modular form and are secured together, and
    said last mentioned channel of each of three of said valves is further interconnected with a channel of fourth of said valves.

29. A filling apparatus in accordance with claim 26 and further comprising fifth, sixth, seventh and eighth membrane valves.

30. A filling apparatus in accordance with claim 26 wherein said first and second valves each have three discrete channels.

31. A method of starting and stopping fluid flow as desired by the use of a flexible membrane carried in a valve body,
    said method comprising providing a valve body with three independent channels extending therein,
    providing a flexible membrane spaced from said three channels and defining therebetween a first valve chamber,
    said membrane further defining a second valve chamber between itself and another portion of said housing,
    control vent means interconnecting said second valve chamber and a control fluid source to move said diaphragm to close said first-metioned valve chamber or open said first-mentioned valve chamber as desired,
    and selectively interconnecting two of said channels with said first-mentioned valve chamber by ports defined by said valve housing while a third of said channels provides a path for fluid flow which path intersects with a fluid flow path in one of said last-mentioned two channels at a point spaced from said valve body.

32. A valve construction comprising a housing,
    said housing having a feed channel for a fluid to be controlled,
    said housing having on its exterior surfaces, a plurality of at least two diaphragm valve constructions on outer surfaces thereof with each diaphragm valve construction having a first valve chamber formed by a portion of said housing and a second valve chamber formed by a cap with a diaphragm sealed between each cap in the surface of said housing.
    said feed channel being interconnected with each of said at least two diaphragm valve constructions at the first valve chambers thereof and said first valve chamber thereof each overyling at least two other channels,
    and control vent means for controlling the position of said diaphragm of each valve.

33. A valve construction in accordance with claim 32 wherein said plurality of diaphragm valves include a third diaphragm valve construction and fourth valve diaphragm construction,
    each of said third and fourth diaphragm valve constructions having a first valve chamber formed by a portion of said housing, and a second valve chamber formed by a cap with a diaphragm sealed between each cap and the surface of said housing,
    said third diaphragm valve construction having one of said channels ported to the first valve chamber thereof and to the first valve chamber of one of said at least two diaphragm valve constructions, to which the said feed channel is interconnected.

34. A valve construction in accordance with claim 33 and further comprising said fourth diaphragm valve construction having a channel ported to the first valve chamber thereof and to the first valve chamber of the other of said at least two diaphragm valve constructions, to which the said feed channel is interconnected.

35. A valve construction in accordance with claim 34 wherein said feed channel extends through said housing.

36. A modular array of valves, comprising a plurality of valve constructions each in accordance with claim 34 wherein the feed channels of each valve construction are interconnected.

37. A valve construction comprising a polyhedral housing, said housing havng at least three exterior surfaces,
- a diaphragm valve construction on each of said three surfaces,
- each diaphragm valve construction having a first valve chamber formed by a portion of said housing and a second valve chamber formed by a cap with a diaphragm sealed therebetween,
- vent means in each of said second chambers for controlling the position of the diaphragm of each valve,
- said housing having at least one feed channel to carry fluid to be controlled,
- said feed channel being interconnected with at least two of the said plurality of diaphragm valve constructions at the said first chambers thereof and at least two other channels in said housing with a diaphragm of a valve construction overlying said feed channel and said two other channels.

38. A valve construction in accordance with claim 37 wherein one of said two diaphragm valve constructions has a second channel interconnected with both the first valve chamber thereof and the first valve chamber of a third of said plurality of diaphragm valve constructions.

* * * * *